Patented Feb. 10, 1931

1,792,097

UNITED STATES PATENT OFFICE

DAVID L. JACOBSON, OF PITTSBURGH, PENNSYLVANIA, ASSIGNOR TO THE KOPPERS COMPANY, A CORPORATION OF PENNSYLVANIA

GAS-PURIFICATION PROCESS

No Drawing.    Application filed October 9, 1926.   Serial No. 140,685.

My invention relates to the purification of fuel gas by means of an alkaline solution circulated through a cycle comprising an absorption stage and an actification stage, and more particularly to processes of this nature employing alkaline solutions containing small amounts of metallic salts in suspension or solution, for the purpose of promoting the liberation of free sulphur during actification of the solutions.

An object of my invention is to reduce the consumption of alkali in gas purification processes of the character described.

A second object of my invention is to increase the production of free sulphur in the actification stage of a gas purification process.

A further object of my invention is to increase the rate of oxidation of metallic compounds such as iron sulphide when such compounds are present in gas purification solutions for the purpose of promoting the oxidation of the dissolved sulphides to free sulphur.

A still further object of my invention is to maintain metallic compound in alkaline suspension in an extremely finely divided, or colloidal, state.

In gas purification processes involving the use of simple alkaline solutions, for example, those covered by U. S. Patents Nos. 1,389,980 and 1,390,037, granted to Charles J. Ramsburg and myself, respectively, hydrogen sulphide is absorbed from the gas as sodium hydrosulphide, according to the following reaction:

(1) $H_2S + Na_2CO_3 = NaHS + NaHCO_3$.

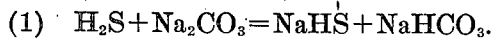

When the solution containing sodium hydrosulphide is subjected to aeration in the actification stage, the actifier air removes hydrogen sulphide from the system and causes a reversal of this reaction with consequent regeneration of the alkali.

More recent gas purification processes have been based on the use of alkaline solutions containing metallic compounds such as ferric oxide or nickel sulphide, or the like, in solution or suspension.

The metallic compounds used for this purpose are compounds, such as the oxide, hydrate, or sulphide, of the iron subgroup of the eighth group of the periodic system, which comprises iron, nickel and cobalt. In such processes, the oxidation of sodium hydrosulphide is carried out in such manner as to liberate the sulphur in elemental form. This sulphur is ordinarily separated from the solution by flotation. The oxidation may take place through sulphidation and oxidation of the metallic compound, as in the case of some alkaline iron suspensions, or the oxidation may take place under the catalytic influence of the metallic compound, as in the case of alkaline solutions containing small amounts of nickel sulphide.

In all such processes of gas purification, whether based on the use of simple alkaline solutions or involving the utilization of suspensions or solutions of the class just described, a certain amount of alkali is consumed in irreversible side reactions, such as the formation of sodium thiosulphate. But it has been shown that metallic compounds that have utility in promoting the liberation of free sulphur exert an influence upon side reactions of the character indicated, resulting in greatly increased formation of thiosulphate as compared with the processes in which a simple alkaline solution is used, and it is toward the reduction of such secondary reactions in gas purification processes involving alkaline suspensions of metallic compounds, that my invention is directed.

I have discovered that the presence of small amounts of certain substances in the alkaline suspension retards the formation of thio-compounds, such as sodium thiosulphate. Accordingly, I recirculate an alkaline suspension of a compound of a metal of the iron subgroup of the eighth periodic group, such as iron oxide, and containing one or more of said substances over the flowing gas in suitable contact apparatus (this constituting an absorption stage) and through further apparatus wherein the suspension is subjected to aeration or the like (which constitutes an actification stage). In general, the substances which I have found suitable for my purpose are organic compounds containing hydroxyl (OH) groups, or their derivatives or materials containing them. Such compounds may be either aromatic in nature, such, for example, as phenol and cresol, or aliphatic, such as iso-amyl alcohol; and they may contain one hydroxyl group, as in phenol; two, as in resorcinol; three, as in pyrogallol; or more. In addition to the hydroxyl group, they may contain any other groups or elements, such, for example, as Cl, Br, I, $So_3H$, $NH_2$, $OCH_3$, $CH_3$, CHO, $NH_2$, NO, CN, etc. I may use hydroxy derivatives of saturated ring compounds, such as cyclo-hexanol; hydroxy compounds of a camphor type, such as borneol; hydroxy derivatives of terpenes, such as menthol; hydroxy derivatives of conjugated ring compounds (naphthalene, anthracene, anthraquinone, etc.), such as alizarin; hydroxy derivatives of organic heterocyclic substances, such as hydroxy quinolines; or compounds with a hydroxyl group in the side chain, such as benzyl alcohol.

I may also use the salts of any of these compounds, such as sodium phenolate, which would be formed as soon as phenol were added to a sodium carbonate solution. It is not necessary to use these organic materials in a pure condition but they may be used alone or in combinations in crude or pure form. For example, I may use crude organic materials which contain substances of the desired character, such as mixed tar acids of high or low temperature tars, crude cresylic acid, heavy tar acid residues, and the like.

The amount of such material added to the gas purification system will vary according to the nature and cost of the material, the effect desired and other factors, but, taking as a specific example the use of phenol, I prefer to use this material in amounts equal to, or less than, 2% of the alkaline absorbent liquid. Substantially any appreciable amount will be effective and higher amounts would ordinarily be prohibitive in cost. A heavier and more complex material would naturally be used in larger amount than the specific example given, and some, for example, tar, may be used in amounts as high as 5% of the absorbent liquid.

The utility of compounds of the nature indicated is marked. For example, in an actual test, with a 3% solution of sodium carbonate containing the equivalent of 0.5% of $Fe_2O_3$, 57% of the hydrogen sulphide absorbed by this liquid was converted to sodium thiosulphate; whereas, with a similar liquid containing 2% of phenol, the amount of sodium thiosulphate formed was reduced to 27% of the $H_2S$ absorbed. Moreover, it required 120 minutes to oxidize the iron sulphide present in this liquid in the absence of phenol, while under the same conditions but in the presence of 2% of phenol, only 50 minutes was required to oxidize the iron sulphide present.

As a further example of the beneficial effect of the presence of a hydroxy derivative of an organic compound, only 32% of the $H_2S$ absorbed by an alkaline iron suspension of the character indicated and containing 2% of cresylic acid was converted to sodium thiosulphate, while only 50 minutes was required for the oxidation of the iron sulphide.

The organic hydroxy compound may be added to the liquid purification system in any of a number of ways. For example, it may be added directly to the system or it may be dissolved in water or alkaline solution. It may be dissolved in the soda solution which is added to the system to make up for decreased alkalinity.

I have further discovered that, when a material of the character specified, for example, phenol, is added to the alkaline solution prior to the addition of the metallic compound, and the metallic oxide or hydroxide is precipitated in the presence of the organic material, the said organic material will serve as a stabilizer, tending to retain the metallic compound in a colloidal state of subdivision, in which it is especially available and active. This may be accomplished by adding to the alkaline solution containing the organic hydroxy compound a solution of a metallic salt, such as ferric chloride. The iron is precipitated as hydrate, and the organic hydroxy compound stabilizes the suspension thus formed.

In many instances, metallic oxides are pulverized and added directly to the alkaline solution. In such cases, I prefer to grind the oxide, as in a ball or colloid mill, in the presence of the organic material, the finely ground mixture being added to the alkaline liquid.

In my invention, I provide feasible means for reducing the formation of products of side reactions in alkaline solutions used in cyclic processes of gas purification. My invention has additional advantages in that increased amounts of valuable sulphur are liberated as such, the oxidation of certain materials, such as iron sulphide, which may be present in gas purification systems, is facilitated, and the metallic compound is stabilized in a very fine state of subdivision and suspension.

My invention is not limited to the specific examples hereinabove recited but is to be construed within the scope of the following claims.

I claim as my invention:

1. The process of purifying gas which comprises washing the gas with an alkaline suspension of a compound of a metal of the iron subgroup of the eighth group of the periodic system, and containing in solution a hydroxy derivative of an organic non-paraffin compound.

2. The process of purifying gas which comprises washing the gas with an alkaline suspension of an iron compound and containing in solution a hydroxy derivative of an organic non-paraffin compound, removing the suspension from contact with the gas, aerating it, and returning it to contact with the gas.

3. A liquid for removing impurities from gas which comprises an alkaline suspension of an iron compound containing up to 2% of a phenol.

4. A liquid for purifying gas comprising a solution of from 1 to 3% alkalinity and containing up to 2% of an iron compound and up to 2% of a phenol.

5. The process of regenerating a fouled alkaline suspension containing a compound of a metal of the iron subgroup of the eighth group of the periodic system which comprises passing a gas containing oxygen through the liquid, in the presence of a hydroxy derivative of an organic non-paraffin compound.

6. The process of reducing thiosulphate formation in alkaline gas purification liquid containing a compound of a metal of the iron subgroup of the eighth group of the periodic system which comprises adding to said liquid an appreciable amount of a hydroxy derivative of an organic non-paraffin compound.

7. The process of adding a metallic compound to an alkaline gas purification solution, which comprises precipitating the metallic compound in the presence of a hydroxy derivative of an organic no-paraffin compound.

8. The method of preparing a gas purification liquid which comprises grinding an oxide of a metal to a finely divided state, in the presence of a hydroxy derivative of a non-paraffin organic compound, and then mixing the finely ground product with an alkaline solution.

In testimony whereof, I have hereunto subscribed my name this seventh day of October, 1926.

DAVID L. JACOBSON.